(12) United States Patent
Lucas et al.

(10) Patent No.: US 8,356,852 B2
(45) Date of Patent: Jan. 22, 2013

(54) AUTOMOTIVE VEHICLE BODY CLOSURE WITH STORAGE COMPARTMENT

(75) Inventors: Marc Jonathon Lucas, Novi, MI (US); Kip Alan Ewing, Bloomfield Hills, MI (US); Julie D'Annunzio, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 113 days.

(21) Appl. No.: 12/887,583

(22) Filed: Sep. 22, 2010

(65) Prior Publication Data
US 2012/0068492 A1    Mar. 22, 2012

(51) Int. Cl.
*B60P 3/34* (2006.01)
*B60R 19/38* (2006.01)

(52) U.S. Cl. .................................. 296/37.1; 293/118
(58) Field of Classification Search .............. 296/37.1, 296/146.13, 76, 62, 26.09, 56, 146.8, 37.16, 296/57.1; 293/106, 118, 116; 40/211; 340/5.64, 340/5.62, 426.36
See application file for complete search history.

(56) References Cited

U.S. PATENT DOCUMENTS

| | | | | |
|---|---|---|---|---|
| 2,739,010 A | * | 3/1956 | Rowland | 362/496 |
| 3,933,385 A | * | 1/1976 | Sanford et al. | 293/136 |
| 5,150,939 A | * | 9/1992 | Simin | 296/37.1 |
| 5,678,872 A | * | 10/1997 | Slater | 293/118 |
| 5,850,135 A | | 12/1998 | Kuki et al. | |
| 6,474,715 B2 | | 11/2002 | Fukushima et al. | |
| 6,601,895 B1 | | 8/2003 | Tannenbaum et al. | |
| 6,644,707 B2 | * | 11/2003 | McLaughlin et al. | 296/26.09 |
| 6,926,326 B2 | | 8/2005 | Iyoda et al. | |
| 7,222,985 B2 | * | 5/2007 | Henoch | 362/196 |
| 2001/0022450 A1 | * | 9/2001 | Delavalle et al. | 296/37.1 |
| 2005/0140159 A1 | | 6/2005 | Barber | |
| 2006/0049731 A1 | | 3/2006 | Choi et al. | |
| 2006/0061333 A1 | | 3/2006 | Kranz | |
| 2008/0197987 A1 | * | 8/2008 | King et al. | 340/426.36 |
| 2009/0096575 A1 | * | 4/2009 | Tieman | 340/5.62 |
| 2009/0160607 A1 | * | 6/2009 | Edwards et al. | 340/5.61 |
| 2009/0222174 A1 | * | 9/2009 | Frommer et al. | 701/49 |
| 2009/0231094 A1 | * | 9/2009 | Higgins et al. | 340/5.64 |

FOREIGN PATENT DOCUMENTS

| | | |
|---|---|---|
| AU | 2008200543 A1 | 8/2009 |
| EP | 2157637 A1 | 2/2010 |
| JP | 2009136108 A | 6/2009 |
| WO | 7900630 A1 | 9/1979 |
| WO | 2009035531 A2 | 3/2009 |

* cited by examiner

*Primary Examiner* — Glenn Dayoan
*Assistant Examiner* — Sunsurraye Westbrook
(74) *Attorney, Agent, or Firm* — David B. Kelley; Brooks Kushman P.C.

(57) ABSTRACT

A storage compartment within an automotive vehicle rear body closure, such as a hatch or trunk, is accessed through a door that serves as a license plate attachment panel. The door may be part of a tub hinged along its lower edge and that occupies the storage compartment when the door is closed.

13 Claims, 3 Drawing Sheets

AUTOMOTIVE VEHICLE BODY CLOSURE WITH STORAGE COMPARTMENT

BACKGROUND

1. Technical Field

The present invention relates to automotive vehicles having a rear body closure, such as a hatch back or trunk lid, and more specifically to such a body closure having an internal storage compartment.

2. Background Art

Some types of electrically powered vehicles, such as plug-in hybrids and battery electric vehicles, use a charging cord to connect the vehicle to an off-board power supply when it is necessary to charge/re-charge the on-board batteries. In some cases, the charging cord may be carried on board the vehicle so that the cord is available for use anywhere that charging of the batteries is desired. If the vehicle charging port or receptacle is located on an exterior panel of the vehicle it may be advantageous to be able to disconnect the cord from the receptacle when it is not being used and store it in the vehicle at some location remote from the receptacle.

It is important to provide secure storage for the charging cord when it is not in use, and also to ensure that the vehicle operator has easy access to the cord when needed. If the charging cord is stored loose in the trunk or other cargo compartment of the vehicle, it may be difficult to find when needed, particularly if there are other objects in the trunk or cargo compartment that may be hiding or blocking access to the cord. Even if the charging cord is stored in a tray or sub-compartment within the vehicle cargo compartment, access to that area may be blocked by other objects and so require removal of those other objects in order to reach the charging cord.

JP 2009136108A teaches a vehicle having a permanently-attached charging cord that is stored in a compartment integrated with the rear bumper of the vehicle.

The compartment is accessed by a hinged door. Why is this different from storing a non-permanently-attached, completely-removable cord in the same place, and putting a license plate on the door?

Our door will have a spring to bias it closed. This wouldn't work with the permanent cord, if the door snapped shut it would pinch and/or damage the cord.

Our compartment/door is in/or a hatch or trunk rather than a bumper. This utilizes otherwise unused space between inner and outer panels of the hatch/trunk, and allows the bumper design to be optimized for crash damage mitigation.

SUMMARY

In one disclosed embodiment, apparatus for storing an item on board an automotive vehicle comprises a storage compartment disposed between an inner panel and an outer panel of a movable body closure and having an opening through the outer panel, and a door movable between a closed position wherein it closes off the opening and an open position wherein an item may be inserted into and removed from the compartment thorough the opening, the door comprising a license plate attachment panel on its outer surface. The compartment provides secure storage for and convenient access to items such as an electric vehicle charging cord.

In another disclosed embodiment, apparatus for storing an item aboard an automotive vehicle comprises a vehicle body closure movable between a lowered/closed position and a raised/open, the body closure having inner and outer panels, a storage compartment disposed within the body closure between the inner panel and the outer panel and having an opening through the outer panel, and a door movable between a closed position and an open position wherein an item may be inserted into and removed from the compartment thorough the opening, the door comprising a license plate attachment panel on its outer surface.

In another disclosed embodiment, an automotive vehicle comprises a rear hatch movable between a lowered position and a raised position to alternatively close and open a rear cargo area of the vehicle, the hatch having inner and outer panels, a storage compartment disposed between the inner panel and the outer panel of the hatch, and a door movable relative to the rear panel between a closed position and an open position to alternatively deny and allow access to the storage compartment thorough an opening in the outer panel, the door comprising a license plate attachment panel on its outer surface.

BRIEF DESCRIPTION OF THE DRAWINGS

Embodiments of the present invention will now be described by way of example only with reference to accompanying drawings in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
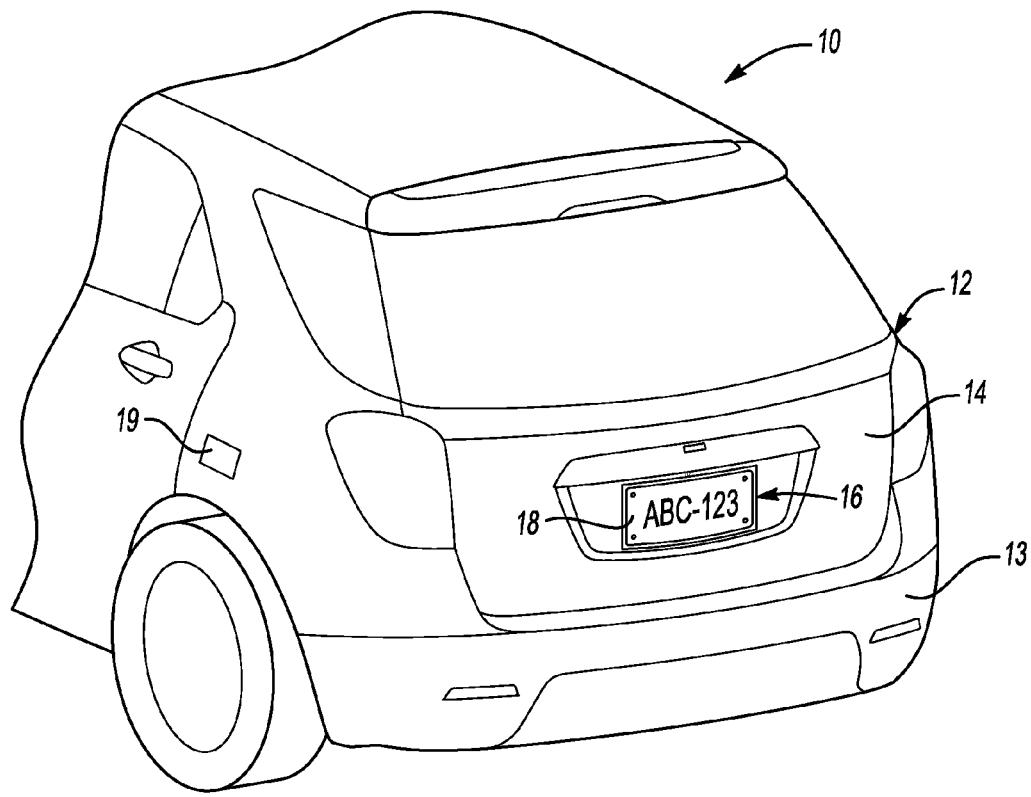
FIG. 1 is a schematic view of an electric vehicle with a hatch-type body opening.

Referring to FIG. 1, an automotive vehicle 10 has a rear body closure 12 and a rear bumper 13 disposed below the body closure. Body closure 12 has an outer panel 14 and a storage access door 16 that closes off a storage compartment, as will be described in greater detail below. Door 16 constitutes an attachment panel for license plate 18 which is attached to the outer surface of the door. A battery charging receptacle 19 is located on the exterior of the vehicle and may be provided with a cover (not shown) for protection when not in use.

Body closure 12 is shown in FIG. 1 as being a rear hatch of the type well known in the automotive industry, and is shown in a closed/lowered position. However, a storage apparatus as disclosed herein may be used in conjunction with other types of body closures, such as a trunk lid. The location of the storage compartment within body closure 12, as opposed to within bumper 13, allows the bumper to be optimized for crash damage mitigation without its design being compromised by trying to incorporate a storage compartment and/or door. Integration of the compartment door 16 with the license plate mounting panel improves the aesthetics of the rear portion of the car, since the door is "hidden" behind the license plate 18 and no additional panel lines, handles, or other visible features are necessary.

Figure 2:
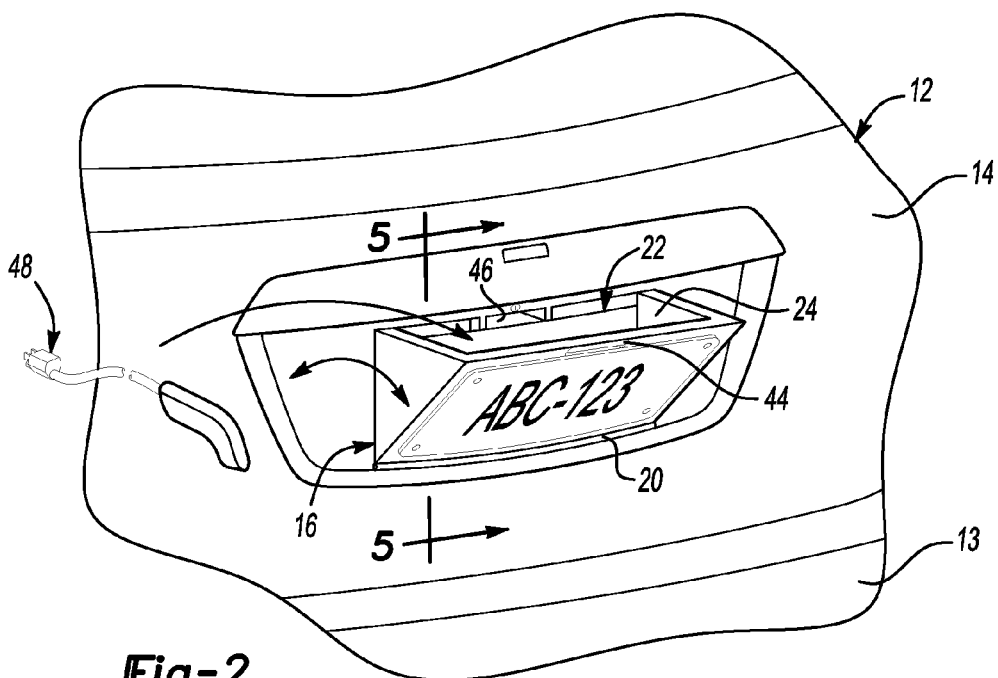
FIG. 2 is a schematic view of a first embodiment of a storage apparatus.

In a first embodiment shown in FIG. 2, door 16 is attached to body closure 12 by a hinge 20 extending along all or some portion(s) of the lower edge of the door. Door 16 rotates about hinge 20 between a closed position, seen in FIG. 1, and an open position, seen in FIG. 2. In the open position, door 16 is tipped rearwardly to expose an opening 22 in the outer panel 14 that provides access to a compartment 24 located within the body closure 12.

Figure 5:
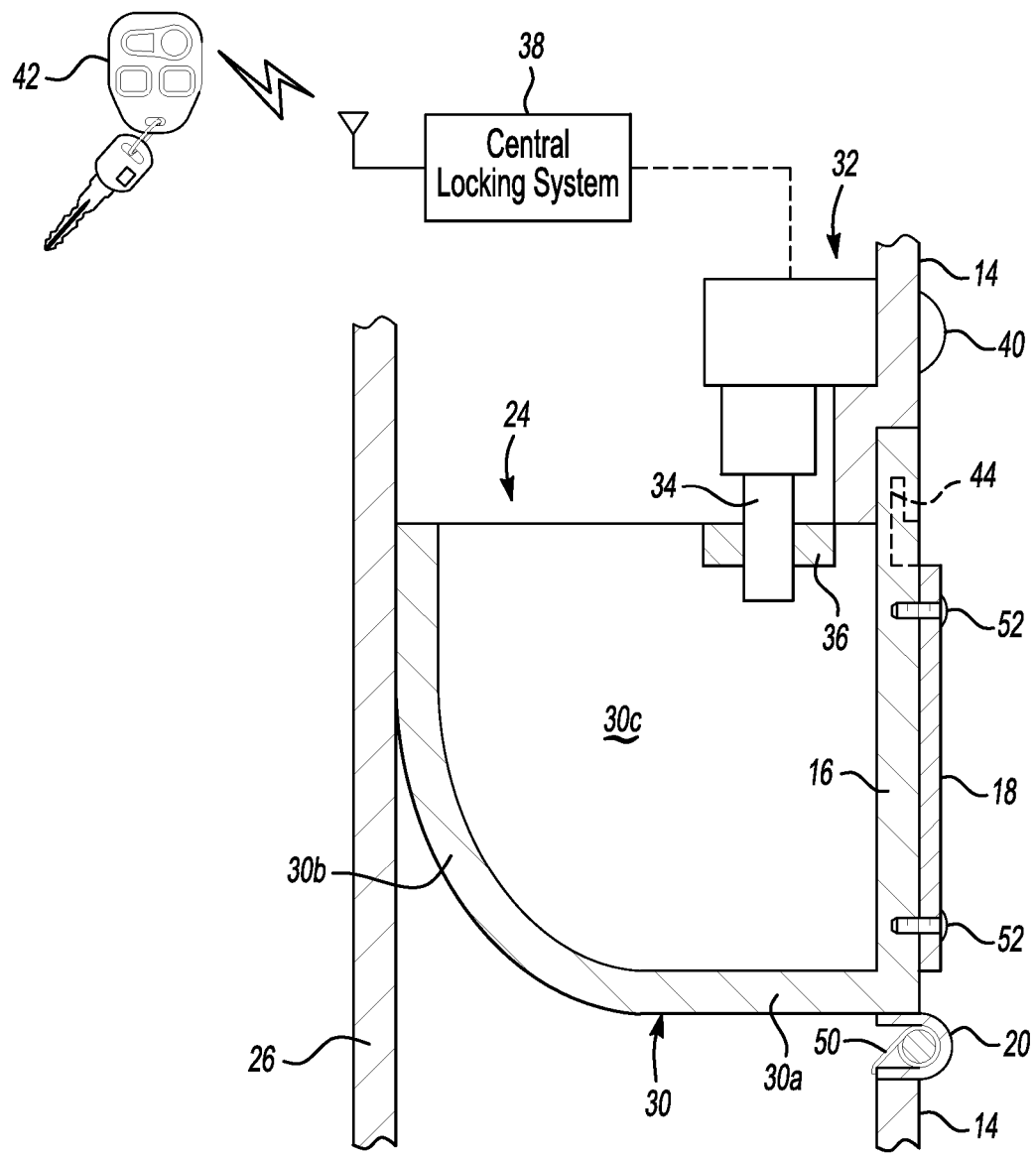
FIG. 5 is a cross section view of the storage apparatus of FIG. 2.

As best seen in FIG. 5, storage compartment 24 is located generally between outer panel 14 and an inner panel 26 of body closure 12. Door 16 may be formed integrally with or otherwise attached to additional structure to form a tub 30 which occupies all or some portion of storage compartment 24 when the door 16 is in the closed position. Tub 30 may comprise a bottom wall 30a, a forward wall 30b, and/or side walls 30c as appropriate to form an enclosed or semi-enclosed volume of adequate size and proper configuration to retain an electric charging cord 48 or other similar-sized item.

A locking mechanism 32 may be provided to secure the door 16 and/or tub 30 in the closed position to prevent unauthorized access to the storage compartment. Locking mechanism 32 may, as is well known in the automotive arts, be mechanically and/or electrically actuated. For example, mechanism 32 may include a solenoid-actuated locking plunger 34 which engages a locking lug 36 attached to or integral with tub 30 and/or door 16. Locking mechanism 32 may be actuated (i.e. locked and/or unlocked) by means of electrical communication from a central locking system 38 and/or by a button or key-actuated lock 40 accessible to an operator on the outer surface of body closure 12. Actuation of locking mechanism 32 may be achieved using a remote control device 42.

A handle 44 may be located on the exterior of door 16 to allow an operator (not shown) to pull the door to the open position. As an alternative to (or in addition to) handle 44, a recess 46 may be formed adjacent an edge of opening 22 to allow the operator to grip the edge of the door with his/her fingertips and pull it open. If desired, hinge 20 may include or be augmented by a spring 50 (see FIG. 5) to bias door 16 to the closed position. Door 16 constitutes an attachment panel for license plate 18. License plate 18 may be attached to the door/attachment panel 16 by any conventionally known method, such as threaded fasteners 52. Accordingly, door 16 may include or be adapted to accept male or female threaded fasteners as required to match mounting holes in license plate 18. Alternatively, door 16 may be provide with holes to receive push-in fasteners (not shown), smooth areas to enable an adhesive bond between the door and plate 18, or any other appropriate means for securing the plate in position.

Figure 3:
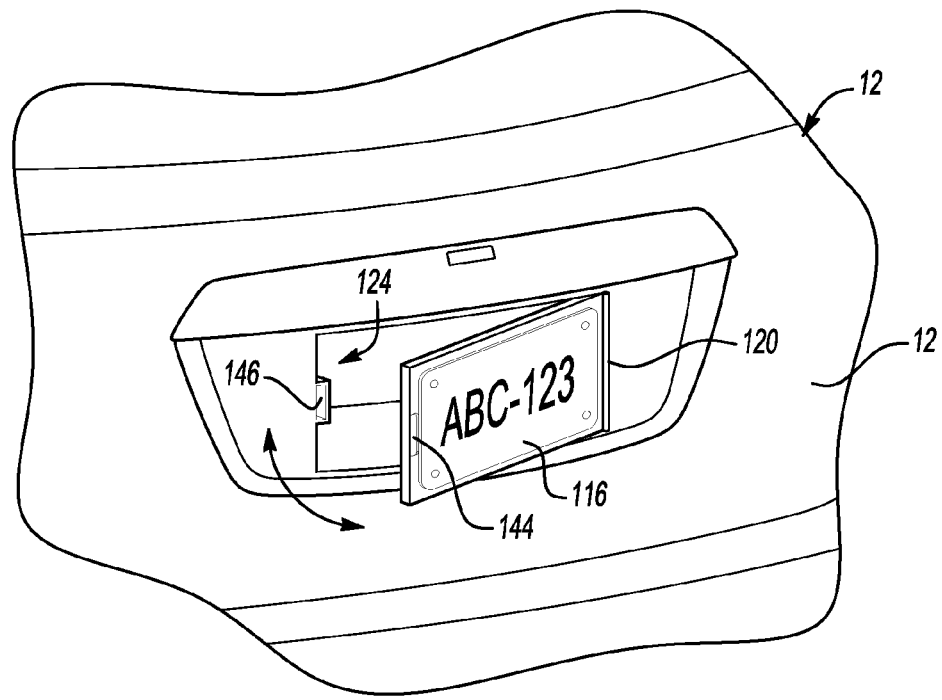
FIG. 3 is a schematic view of a second embodiment of a storage apparatus.

FIG. 3 illustrates a body closure 12 having a storage compartment 124 in the form of a boxed-in area within the body closure. A door 116 is attached to body closure 12 by a hinge 120 adjacent a lateral edge of the door to allow the door to be opened to expose an opening providing access to compartment 124. A handle 144 may be provided on door 116 and/or a recess 146 may be formed adjacent an edge of opening 122 to allow the door to be easily opened by hand. A locking mechanism (not shown) may also be provided, such as the mechanism illustrated in FIG. 2.

Figure 4:
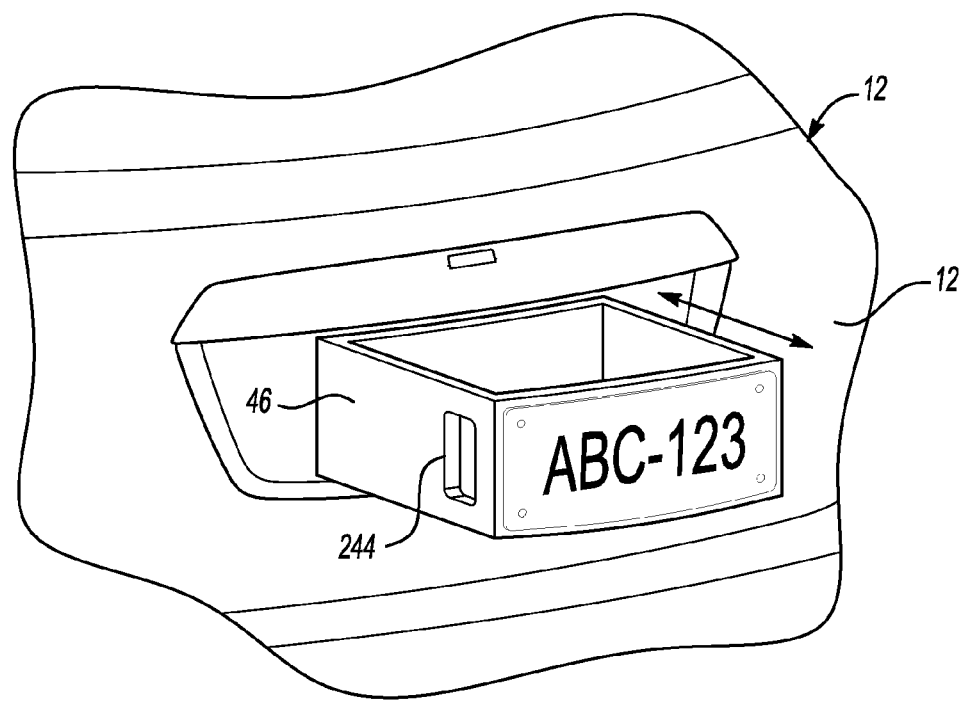
FIG. 4 is a schematic view of a third embodiment of a storage apparatus.

FIG. 4 illustrates a third embodiment of a storage apparatus in which a drawer 46 may be pulled rearwardly relative to the body closure 12 to provide access to the storage compartment 224. As with the previously discussed embodiments, drawer 46 may be secured in its closed position by a locking mechanism (not shown), and handles 244 and/or recesses may be provided to allow the operator to easily pull/push the drawer between its open and closed positions. Slides (not shown) and/or other structure to guide the inward and outward motion of the drawer 46 may be provided.

The disclosed storage apparatus is a convenient and secure place to store charging cord 48 when it is not in use. Charging cord 48 may be coiled-up and bound, wrapped around a spool (not shown) or otherwise secured in a relatively compact fashion for storage. After charging cord 48 is removed from storage compartment 24, it is connected with battery recharging receptacle 19 and with a source of electricity (not shown) to recharge batteries (not shown) carried by the vehicle.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed:

1. Storage apparatus for an automotive vehicle comprising:
   a movable body closure comprising an inner panel and an outer panel defining a storage compartment there between, the outer panel having an opening to the compartment; and
   a door attached to the body closure by a hinge connected to a lower edge of the door and movable between a closed position closing off the opening and an open position offering access to the compartment thorough the opening, the door comprising a license plate attachment panel on its outer surface.

2. The apparatus according to claim 1 further comprising a locking mechanism holding the door in the closed position, the locking mechanism releasable to allow the door to be moved to the open position.

3. The apparatus according to claim 2 wherein the locking mechanism is manually releasable by an operator.

4. The apparatus according to claim 2 wherein the locking mechanism is operatively connected with a central vehicle locking system.

5. The apparatus according to claim 2 wherein the locking mechanism is actuated by a remote control device carried by a vehicle operator.

6. The apparatus according to claim 1 wherein the movable body closure is a hatch movable between a lowered/closed position and a raised/open position.

7. The apparatus according to claim 1 wherein the door is attached to a tub, the tub occupying the storage compartment when the door is in the closed position and pivoting about the hinge along with the door to the open positions.

8. Apparatus for storing an item aboard an automotive vehicle comprising:
   a vehicle body closure movable between a lowered/closed position and a raised/open, the body closure having inner and outer panels;
   a storage compartment disposed within the body closure between the inner panel and the outer panel and having an opening through the outer panel; and
   a door attached to the body closure by a hinge connected to a lower edge of the door and movable between a closed position and an open position wherein the item may be inserted into and removed from the compartment thorough the opening, the door comprising a license plate attachment panel on its outer surface.

9. The apparatus according to claim 8 further comprising a latch.

10. The apparatus according to claim 8 wherein the door is attached to a tub for containing the item, the tub occupying the storage compartment when the door is in the closed position and pivoting about the hinge along with the door to the open position.

11. An automotive vehicle comprising:

a rear hatch movable between a lowered position and a raised position to alternatively close and open a rear cargo area of the vehicle, the hatch having inner and outer panels;

a storage compartment disposed between the inner panel and the outer panel of the hatch; and a door attached to the body closure by a hinge connected to a lower edge of the door and movable relative to the rear panel between a closed position and an open position to alternatively deny and allow access to the storage compartment thorough an opening in the outer panel, the door comprising a license plate attachment panel on its outer surface.

12. The vehicle according to claim 11 further comprising a latch operative to hold the door in the closed position.

13. The vehicle according to claim 11 wherein the door is attached to a tub, the tub occupying the storage compartment when the door is in the closed position and pivoting about the hinge along with the door to the open positions.

* * * * *